United States Patent
Pesquet-Popescu et al.

(10) Patent No.: US 12,542,064 B2
(45) Date of Patent: Feb. 3, 2026

(54) SYSTEM AND METHOD FOR IMPROVED DETERMINATION OF THE COMPLEXITY OF AIR SECTORS

(71) Applicant: THALES, Courbevoie (FR)

(72) Inventors: Béatrice Pesquet-Popescu, Rungis (FR); Dominique Latge, Rungis (FR); David Laville, Rungis (FR); Fateh Kaakai, Rungis (FR)

(73) Assignee: THALES, Courbevoie (FR)

( * ) Notice: Subject to any disclaimer, the term of this patent is extended or adjusted under 35 U.S.C. 154(b) by 268 days.

(21) Appl. No.: 17/631,486

(22) PCT Filed: Jul. 13, 2020

(86) PCT No.: PCT/EP2020/069690
§ 371 (c)(1),
(2) Date: Jan. 30, 2022

(87) PCT Pub. No.: WO2021/018556
PCT Pub. Date: Feb. 4, 2021

(65) Prior Publication Data
US 2022/0270497 A1    Aug. 25, 2022

(30) Foreign Application Priority Data
Jul. 31, 2019 (FR) .................... 1908722

(51) Int. Cl.
*G08G 5/56* (2025.01)
*G06N 20/00* (2019.01)
(Continued)

(52) U.S. Cl.
CPC ............... *G08G 5/56* (2025.01); *G06N 20/00* (2019.01); *G08G 5/55* (2025.01); *G08G 5/59* (2025.01); *G08G 5/727* (2025.01); *G08G 5/76* (2025.01)

(58) Field of Classification Search
None
See application file for complete search history.

(56) References Cited

U.S. PATENT DOCUMENTS

| | | | |
|---|---|---|---|
| 8,185,298 B2 * | 5/2012 | Jha ....................... | G08G 5/0034 701/121 |
| 10,643,480 B2 * | 5/2020 | Sherry ..................... | G06N 7/01 |

(Continued)

FOREIGN PATENT DOCUMENTS

| CN | 105206115 B | | 11/2017 |
|---|---|---|---|
| CN | 105225539 B | * | 12/2017 |

OTHER PUBLICATIONS

"Sector Complexity Study—SESAR 2020", A study commissioned by the Croatia Control Ltd, Faculty of Transport and Traffic Sciences, University of Zagreb, Jul. 2018.
(Continued)

*Primary Examiner* — Angela Y Ortiz
*Assistant Examiner* — Torrence S Marunda, II
(74) *Attorney, Agent, or Firm* — BakerHostetler (57) ABSTRACT

A computation of the processing complexity of an air-traffic-control situation is provided. In particular, the processing complexity of an air-traffic-control situation is computed using a supervised learning engine, trained using the result of analytical functions for computing the processing complexity of air-traffic-control situations.

12 Claims, 5 Drawing Sheets

(51) Int. Cl.
  *G08G 5/55*  (2025.01)
  *G08G 5/59*  (2025.01)
  *G08G 5/72*  (2025.01)
  *G08G 5/76*  (2025.01)

(56) References Cited

U.S. PATENT DOCUMENTS 11,436,502 B2 * 9/2022 Cao .................. G06N 20/00
2019/0138947 A1   5/2019 Cao et al.
2020/0372809 A1 * 11/2020 Ganti ................ G08G 5/0052

OTHER PUBLICATIONS

Laudeman, et al., "Dynamic density: An air traffic management metric", NASA, 1998.
Netjasov, et al., "Developing a generic metric of terminal airspace traffic complexity", Transportmetrica, 2011.
Hilburn, et al., "Toward a non-linear approach to modeling air traffic complexity", Human Performance, Situation Awareness, and Automation: Current Research and Trends HPSAA II, vols. I and II, pp. 207-213, 2005.

* cited by examiner

SYSTEM AND METHOD FOR IMPROVED DETERMINATION OF THE COMPLEXITY OF AIR SECTORS

CROSS-REFERENCE TO RELATED APPLICATIONS

This application is a National Stage of International patent application PCT/EP2020/069690, filed on Jul. 13, 2020, which claims priority to foreign French patent application No. FR 1908722, filed on Jul. 31, 2019, the disclosures of which are incorporated by reference in their entirety.

FIELD OF THE INVENTION

The present invention relates to the determination of the processing complexity of air-traffic-control situations in sectors by operators, air-traffic controllers for example. The present invention also relates to the definition of ATC sectors, and to the assignment of these sectors to operators.

BACKGROUND

The aim of air-traffic-control systems is to make the execution of flights safer, faster and more efficient. They allow collisions between aircraft, or situations in which an aircraft is endangered by its environment (weather, terrain, etc.), to be avoided. They thus allow, by synchronizing the movement of aircraft as finely as possible, not only secure movement of air traffic to be ensured, but also aircraft to respect scheduled flight times and to adopt the most fuel-efficient paths possible.

To this end, air-traffic controllers receive a set of information relative to the airspace: position and predicted paths of aircraft, the weather, etc. Controllers may also communicate, via written messages or oral communications, with aircraft pilots, in order to retrieve, if necessary, additional information and to give them instructions tailored to the situation, so as to guarantee the safety of air traffic, while ensuring the best possible quality of service is delivered to air-transport users. For example, air-traffic controllers may communicate to pilots the opportune moment to land or take off from an airport, or on the contrary instruct them to delay their approach if a landing strip is being used by aircraft at the initially planned time. The quality of the work of air-traffic controllers is therefore essential, to guarantee both the safety and the efficiency of the movement of air traffic.

In order to guarantee that air-traffic controllers are fully up to their tasks, their work is governed by a strict regulatory framework: in particular, in order to limit their fatigue, national regulations may set a maximum number of working hours in a row, per day or per week.

The work of air-traffic controllers is organized by geographical sector. The complexity of the work to be performed in a sector varies depending on a number of factors, the most important of which being the complexity of the traffic: an air-traffic controller will be able to efficiently handle only a limited number of flights simultaneously. In order to limit the workload of each controller, a variable number of controllers may be assigned to each sector, so that each controller deals only with a situation the complexity is of which is low enough (for example, comprising a number of flights and of path conflicts that is limited, where appropriate with respect to environmental features such as the weather for example) for him to be able to carry out his work correctly.

It is therefore necessary to assign an adequate number of controllers to each sector continuously and/or to define sectors of suitable complexity to guarantee the safety and efficiency of the movement of air traffic. At the present time, this assignment is performed manually by teams of air-traffic controllers. However, this manual assignment has a certain number of limitations: given the regulatory constraints governing the work of air-traffic controllers, it is not always easy to arrange for a pool of air-traffic controllers to be ready to be mobilized in the event of an increase in the processing complexity of a sector, unless a high number of controllers are permanently kept in reserve, this being inefficient and expensive.

It is also difficult to estimate in principle the complexity of traffic processing in a sector: although the number of flights to be processed is the main feature, other elements may come into play: traffic density (the more an aircraft's path interacts with a high number of other paths, the more complex its processing will be), the weather (stormy weather will possibly for example complicate the work of controllers), the origin of the aircraft in flight (it may for example be more difficult for a controller to interact with pilots who do not speak the same language and/or have a poor command of English).

In order to automate the evaluation of the processing complexity of an ATC sector, analytical functions have been developed, which allow an index of complexity of processing the traffic in a sector to be evaluated on the basis of a set of parameters (predicted positions and paths of the aircraft, weather, etc.). For example, the publication "*Sector Complexity Study—SESAR* 2020", A study commissioned by the Croatia Control Ltd, Faculty of Transport and Traffic Sciences, Univ of Zagreb, July 2018 defines analytical functions allowing an ATC-complexity index to be computed for an ATC sector based on a set of indicators that have an impact on the processing complexity of an ATC situation: number of aerodromes, area of a sector, number of surrounding sectors, number of altitudes used, average speed of the aircraft, number of incoming flights, number of outgoing flights, number of aircraft in conflict, average conflict convergence angle, traffic density, etc. These indicators may be combined within complex functions. Definition of analytical complexity functions has given rise to many publications such as Laudeman, I V, Shelden, S G, Branstrom, R., & Brasil, C L (1998). Dynamic density: An air traffic management metric, Netjasov, F., Janić, M., & Tošić, V. (2011). Developing a generic metric of terminal airspace traffic complexity. *Transportmetrica*, 7(5), 369-394., or Hilburn, B., & Flynn, G. (2005). Toward a non-linear approach to modeling air traffic complexity. *Human Performance, Situation Awareness, and Automation: Current Research and Trends HPSAA II*, Volumes I and II, 207. The publication "*Sector Complexity Study—SESAR* 2020", A study commissioned by the Croatia Control Ltd, Faculty of Transport and Traffic Sciences, Univ of Zagreb, July 2018 also lists a high number of publications addressing the computation of the complexity of a sector.

However, these analytical functions have a number of disadvantages. Firstly, they are extremely complex, and their execution time varies depending on the input parameters, and especially depending on the number and complexity of the paths of aircraft in a sector. For particularly large sectors, computation time may thus become very long, of the order of several seconds. CPU-computed analytical functions thus do not allow a set and low response time to be guaranteed, for the evaluation of the complexity of a sector. In the case of complex sectors, analytical functions do not guarantee an execution time short enough to allow controllers to be assigned dynamically depending on variations in air traffic.

Analytical functions also have the drawback of returning a theoretical complexity that cannot take into account all the factors having an impact on ATC complexity. Moreover, the objective metrics on which these analytical functions are based do not necessarily correspond to the complexity perceived by air-traffic controllers.

There is therefore a need for a method, for determining the complexity of processing of an ATC sector by a controller, that can be executed in a limited time, and the execution time of which is short enough to allow the computed complexities to be used to dynamically assign air-traffic controllers to sectors depending on the processing complexity thereof.

There is also a need for a method, for determining the complexity of processing of an ATC sector by a controller, that allows the complexity such as perceived by controllers to be determined, as reliably as possible.

SUMMARY OF THE INVENTION

To this end, the subject of the invention is a computer-implemented method that receives as input a set of ATC situations each defined by a sector and a time period, and each associated with a set of input parameters comprising, for the sector and the time period: the paths of aircraft having crossed the sector; meteorological information; said method comprising, for each ATC situation: a step of forming a vector of input parameters comprising parameters of the set associated with the ATC situation; a step of executing an analytical function for computing an ATC-complexity index of the situation, on the basis of the input parameters; said method comprising a step of training a supervised machine-learning engine that has as input associations, for each situation respectively, between its vector of input parameters and its ATC-complexity index.

Advantageously, the method comprises, for at least one ATC situation, carrying out reinforcement learning on the basis of data representative of the workload experienced by an air-traffic controller in the situation.

Advantageously, the method comprises, for at least one ATC situation, a step of computing variations in the ATC-complexity index on the basis of data representative of the workload experienced by an air-traffic controller in the situation, which data are recorded for the sector and during the time period, and of applying reinforcement learning to the supervised machine-learning engine, on the basis of the variations.

Advantageously, the method comprises, for each ATC situation, a step of applying reinforcement learning to the supervised learning engine, this comprising: presenting an ATC situation, and an ATC-complexity index computed by the supervised learning engine for this situation, to at least one air-traffic controller; receiving a complexity-index discrepancy entered by the at least one air-traffic controller; applying a penalty to the learning depending on this discrepancy.

Advantageously, the method comprises a step of comparing sector grouping and ungrouping predictions made on the basis of ATC complexity indices computed by the machine-learning engine and sector grouping and ungrouping, in said set of ATC situations, by controllers.

Advantageously, the method comprises validating the training of the supervised learning engine on the basis of said comparisons.

Advantageously, the method comprises applying reinforcement learning to the supervised learning engine on the basis of said comparisons.

The invention also discloses a system comprising: at least one computing unit able to train a supervised machine-learning engine; an access to at least one data storage medium storing, for a set of ATC situations each defined by a sector and a time period, a set of parameters comprising, for the sector and the time period: the paths of aircraft having crossed the sector; meteorological information; the at least one computing unit being configured, for each ATC situation, to: form a vector of input parameters comprising parameters of the set associated with the ATC situation; execute an analytical function for computing an ATC-complexity index of the situation, on the basis of the input parameters; the at least one computing unit being configured to train a supervised machine-learning engine that has as input associations, for each situation respectively, between its vector of input parameters and its ATC-complexity index.

The invention also discloses a computer program product comprising computer code elements configured to execute a method according to one of the embodiments of the invention.

The invention also discloses a computer-implemented method that receives as input, for a current ATC situation defined by a current sector and a time period, a set of parameters comprising, for the current sector: the paths of aircraft crossing the sector; meteorological information; said method comprising: a step of forming, for the current ATC situation, a vector of input parameters comprising parameters of the set; a step of executing a supervised learning engine to compute, on the basis of the input vector, an ATC-complexity index of the current situation, said engine having been trained using a method according to one of the embodiments of the invention.

The invention also discloses a computer program product comprising computer code elements configured to execute a method according to one of the embodiments of the invention.

The invention also discloses a system comprising: at least one computing unit able to execute a supervised machine-learning engine; at least one input port able to receive, for a current ATC situation defined by a current sector and a time period, a set of parameters comprising, for the current sector: the paths of aircraft crossing the sector; meteorological information; the at least one computing unit being configured to: form, for the current ATC situation, a vector of input parameters comprising parameters of the set; execute said supervised learning engine to compute, on the basis of the input vector, an ATC-complexity index of the current situation, said engine having been trained using a method according to one of the embodiments of the invention.

Advantageously, the at least one computing unit is configured to dynamically redefine the sectors of an airspace, on the basis of the ATC-complexity indices computed by the supervised learning engine for the sectors.

Advantageously, the at least one computing unit is configured to solve a constrained optimization problem, aiming to minimize the total number of sectors in an airspace, while ensuring that the ATC complexity computed by the supervised learning engine for each sector and time period is less than a predefined complexity.

Once trained, the machine-learning engine is capable of predicting the complexity of a situation on the basis of the parameters thereof. Such an engine has the advantage of requiring limited resources to predict the complexity of a given ATC situation. In the inference phase, machine-learning engines may thus predict the complexity of a situation in a limited time, whatever the parameters associated with the situation, unlike analytical functions, the computation time of which may vary substantially, and become very long for particularly complex situations. This therefore ensures that it is possible to determine the complexity of a situation practically in real time.

The invention allows a dynamic allocation of sectors in a given airspace, in order to limit the number of sectors as much as possible, while ensuring that no sector exceeds a complexity threshold beyond which the sector could no longer be processed correctly by the air-traffic controllers.

According to certain aspects, the invention allows ATC-complexity indices to be computed much more precisely than is possible with analytical functions.

According to certain aspects, the invention allows measurements representative of the workload experienced by pilots to be taken into account when the complexity of ATC situations is being learnt, thus allowing situations poorly accounted for by analytical functions to be better modeled.

In certain aspects, the invention allows the complexity of ATC situations to be learnt very effectively, requiring limited input from air-traffic controllers.

BRIEF DESCRIPTION OF THE DRAWINGS

Other features, details and advantages of the invention will become apparent on reading the description, which is given with reference to the appended drawings, which are given by way of example and in which, respectively.

DETAILED DESCRIPTION

Certain acronyms commonly used in the technical field of the present patent application might be employed in the course of the description. These acronyms are listed in the table below, in particular with the corresponding expression and their meaning.

TABLE 1

| Acronym | Expression | Meaning |
| --- | --- | --- |
| ACC | Area Control Center | Regional center ensuring the safety of air traffic. |
| AOC | Aeronautical Operational Control | A set or subset of the applications used by an aircraft to communicate with ground services. |
| ATC | Air-Traffic Control | Service provided by air-traffic controllers on the ground to guide an aircraft to the ground safely. |
| ATFM | Air-Traffic Flow Management | The part of air-traffic management aiming to avoid congestion of aerodromes. |
| ATM | Air-Traffic Management | All of the activities carried out to ensure the safety and fluidity of air traffic. |
| CPDLC | Controller-Pilot Data Link Communications | Method of communication between controllers and pilots, defining a set of elementary messages that can be exchanged. These messages correspond to the procedures used for air-traffic control. |
| FIR | Flight Information Region | Volume in which a given control center ensures the smooth running of flights. In France, the FIRs cover a flight space up to 19500 feet. |
| FL | Flight Level | In aeronautics, designates an altitude expressed in hundreds of feet above the 1013.25 hPa isobaric surface. |
| GPS | Global Positioning System | A satellite positioning system. |
| GRIB | GRIdded Binary | File format used to broadcast weather-forecast data. The GRIB format is standardized by the World Meteorological Organization (WMO). |
| NAS | Network Accessed Server | An autonomous file server connected to a network and the data of which are accessed remotely. |
| SIGMET | SIGnificant METeorological Information | Type of message intended for aircraft in flight and signaling very dangerous observed or forecast meteorological conditions. |
| UIR | Upper Information Region | FIR covering, in France, the airspace located above 19500 feet. |
| VCS | Voice Communication Systems | Voice communication systems used by air traffic. |

Figure 1:
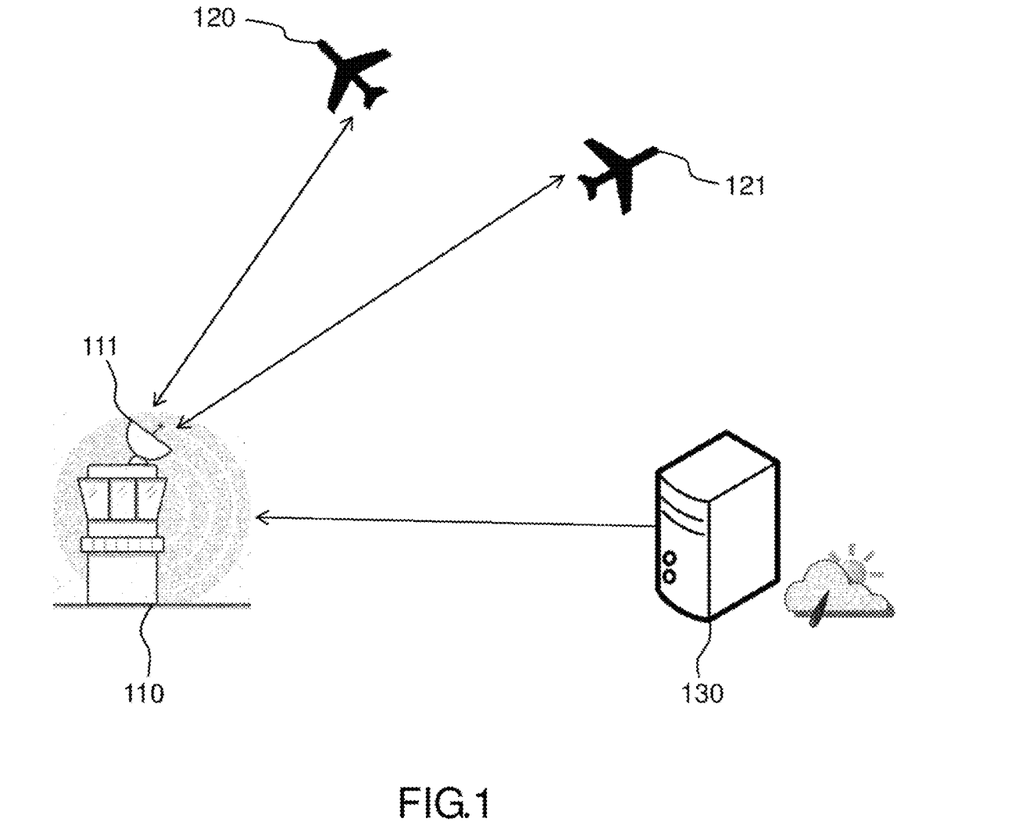
FIG. 1 shows an air-traffic-control system, in which the invention may be implemented.

FIG. 1 shows an example of an air-traffic-control system in which the invention may be implemented.

The air-traffic-control system shown in FIG. 1 comprises a control tower 110, equipped with a radar 111 allowing aircraft 120, 121 flying through a given sector to be located. The control tower 110 is able to communicate with the aircraft, for example via a radio link, in order to give information and instructions to the aircraft, but also to receive information and requests from the aircraft. In order to provide the aircraft with the most relevant indications, the control tower may receive data from external providers, such as a weather server 130. Thus, an air-traffic controller may provide indications and instructions to the pilots of the aircraft on the basis of a dataset comprising the planned paths of the aircraft in his sector, interactions with the pilots, and environmental data such as weather forecasts.

The system of FIG. 1 is given solely by way of nonlimiting example, and the invention may be implemented in many systems for controlling air traffic, such as ATC or ATFM systems.

Figure 2:
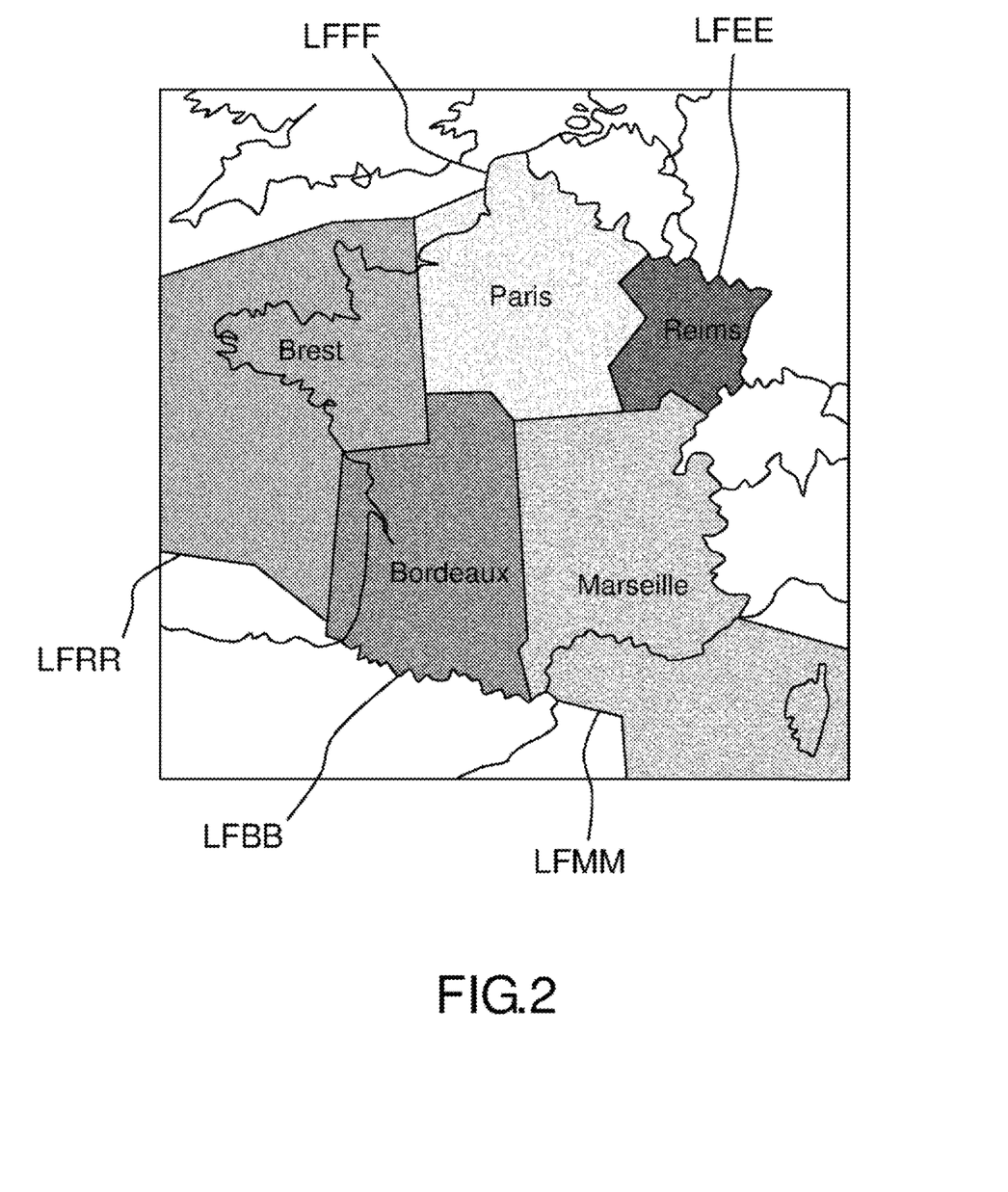
FIG. 2 shows a set of sectors on which the invention may be implemented.

FIG. 2 shows a set of sectors on which the invention may be implemented.

An airspace is said to be controlled when aircraft maneuvers are subject to clearance, i.e. authorization by an air-traffic controller. FIG. 2 shows the controlled airspace in France. The territory of Metropolitan France is controlled by five control centers that each control one FIR:

the Bordeaux center controls the FIR LFBB, the Reims center manages the FIR LFEE;
the Paris center manages the FIR LFFF;
the Marseilles center manages the FIR LFMM;
the Brest center manages the FIR LFRR.

In France, the FIRs cover the airspace up to 19500 feet; beyond this is a UIR managed by the 5 control centers. These regions are in turn divided into control sectors, such as for example the sectors referred to as area control centers (ACC). Each of the sectors is continuously crossed by a certain number of aircraft. As explained above, the complexity of processing air traffic in a sector varies depending on the number of aircraft in this sector, but also on other features such as the weather, or traffic density. In order to allow controllers to carry out traffic control under good conditions, the number of controllers assigned to a sector may be modulated depending on the processing complexity thereof. The shape and size of the sectors may also be configured.

Figure 3:
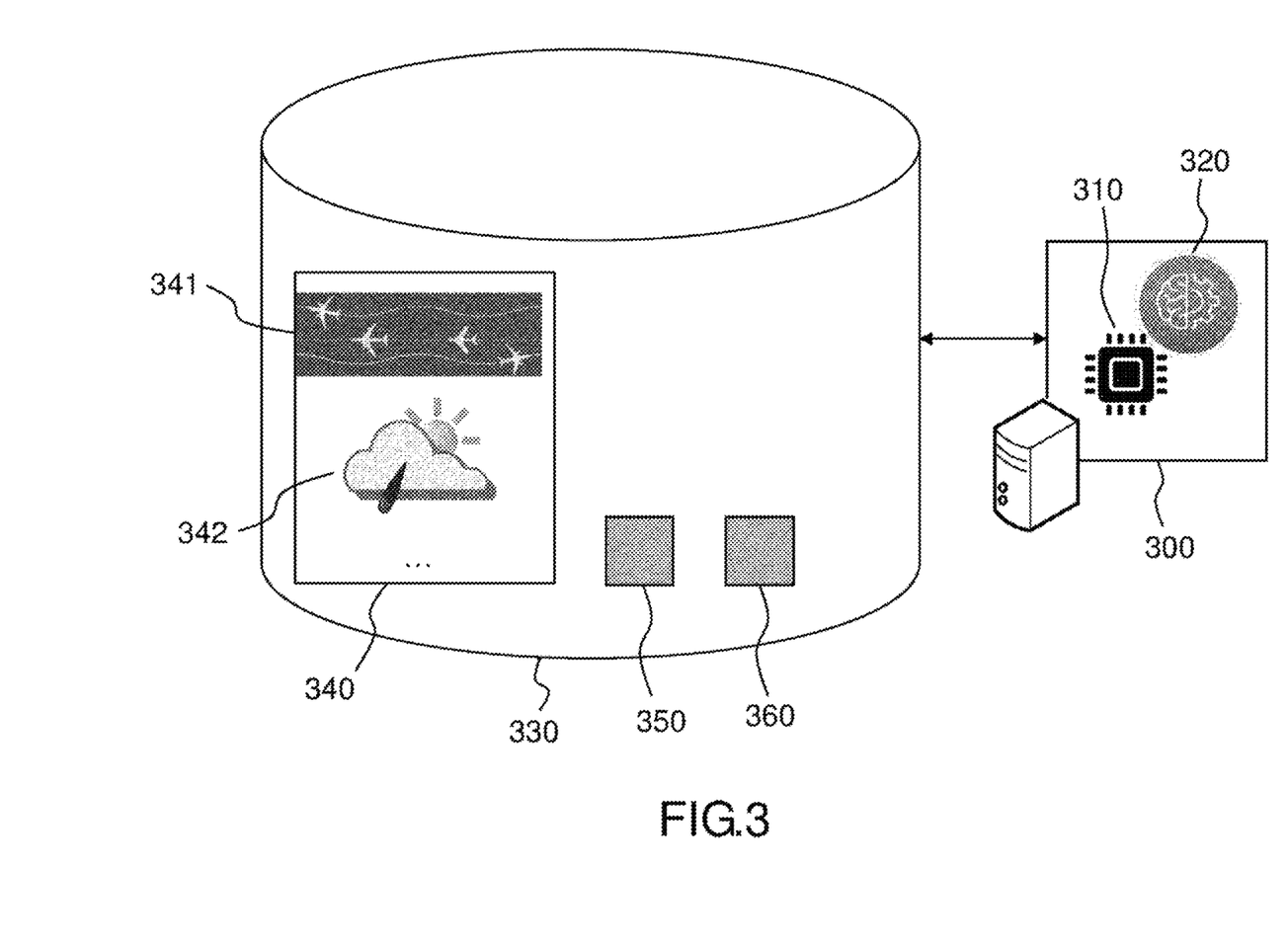
FIG. 3 shows a computing system that allows a supervised machine-learning engine for determining the processing complexity of an ATC situation to be trained, in a set of modes of implementation of the invention.

FIG. 3 shows a computing system that allows a supervised machine-learning engine for determining the processing complexity of an ATC situation to be trained, in a set of modes of implementation of the invention.

The system 300 is a computing system. According to one set of embodiments of the invention, the system 300 may be a single computing device such as a desktop computer, a server, or any other system able to perform computations. The system 300 may also comprise a plurality of computing devices. For example, the system 300 may be a server farm comprising multiple computing servers.

The system 300 thus comprises at least one computing unit 310 able to train a supervised machine-learning engine 320.

The at least one computing unit 310 may be any type of computing unit able to perform computations. For example, the computing unit may be a processor configured with machine instructions, a microprocessor, an integrated circuit, a microcontroller, a programmable logic controller, or any other computing unit able to be programmed to perform computing operations.

The supervised machine-learning engine 320 may be any type of supervised machine-learning engine. For example, it may be an artificial neural network, a support-vector machine, or a deep-learning engine, such as a deep neural network, or a convolutional neural network. Although any type of supervised learning engine may be used in the invention, a supervised learning engine based on a neural network is particularly advantageous, because, once trained, it takes a limited time to execute. Execution of an artificial neural network, once trained, also requires a limited amount of computing resources.

The system 300 comprises an access to at least one data storage medium 330. The at least one data storage medium 330 may be any type of storage able to store data: hard disk, CD, DVD, magnetic tape, memory card, USB key, Flash memory, random-access memory, etc.

The data storage medium may be integrated into the system 300. For example, if the system 300 is a computing device such as a server, the data storage medium may be a hard drive of the device. In the case where the system 300 is composed of a plurality of computing devices, the at least one storage medium may be a set of memories distributed between the various computing devices.

The system 300 may also have access to the at least one data storage medium 330 via a connection. For example, the at least one data storage medium may consist of at least one hard disk accessed remotely, for example via at least one NAS server, or via a cloud-computing system.

The at least one data storage medium 330 stores, for a set of ATC situations 340 each defined by a sector and a time period, a set of parameters comprising:
  the paths 341 of aircraft having crossed the sector;
  meteorological information 342 for the sector and the time period.

The aircraft paths 341 may be expressed in various ways. For example, the paths may be expressed in the form of 4D paths, with waypoints defined by a latitude, longitude, and an FL and time of passage. The paths may also comprise, for each waypoint, an associated heading. A path may also be associated with a type of airplane and/or a call sign (denomination of a given aircraft).

The meteorological information 342 may in particular comprise at least one of the following items of information: numerical information (temperatures, wind speeds and directions, pressures, etc.), for example in the form of a GRIB file, text describing the weather (for example, presence of a storm, thunderstorm, etc.), SIGMET messages. More generally, any type of data providing indications as regards the weather within the sector may be used.

These parameters correspond to recordings of actual situations that have occurred in the sectors in the time periods in question. They thus define, for an ATC situation defined by a given (sector, time period) pair, input parameters representative of the processing complexity of the sector. As indicated above, these parameters comprise at least the paths of aircraft having crossed the sector, and meteorological information for the sector and the time period in question.

More generally, the parameters may comprise, according to various embodiments of the invention, any type of parameters that may have an impact on ATC complexity.

In one set of embodiments of the invention, the at least one data storage medium 330 also stores, for each ATC situation, data 350 representative of the workload experienced by an air-traffic controller and recorded for the corresponding sector and during the corresponding time period. These interaction data are data recorded while the sector was being processed during the time period.

These data 350 may for example be of one or more types chosen from:
  interactions between controllers and an air-traffic-control interface (number of clicks, speed and time of movement of mouse cursors, etc.). Specifically, a high number of interactions between the controller and the interface is indicative of a high workload;
  biometric data indicative of the workload experienced by an air-traffic controller: electrodes in the brain, heart rate, speed of eye movements, etc.;
  data relating to the interaction between the ATC system and other systems: number of CPDLC messages, size of VCS communications between the ATC and the pilots, etc. Once again, a high number and/or complexity of interactions between the air-traffic-control system and its environment is indicative of a high workload.

These data are presented by way of indication of recorded interaction data representative of the workload experienced by controllers, but any datum indicative of the workload experienced by controllers may be used. These data must however have been recorded during the processing of the ATC situation in question (which therefore corresponds to an actual situation that occurred in the past), to be representative of the workload actually experienced by the pilot.

As will be explained below, these data allow the complexity actually experienced by controllers to be taken into account in machine learning intended to learn the complexity of ATC situations.

In one set of embodiments of the invention, the at least one data storage medium 330 also stores the sector grouping and ungrouping decisions that have been made by air-traffic controllers, for at least certain ATC situations 340.

Thus, the at least one storage space 330 is able to store, for ATC situations that occurred in the past, any type of data that has been processed by an air-traffic-control (ATC, ATFM, etc.) system in past situations, and that is directly or indirectly related to processing complexity. This recording is generally done automatically by air-traffic-control systems. All that is thus required is to select the relevant information to store it.

The at least one computing unit 310 is configured to train the machine-learning engine 320 to compute a processing-complexity index of a sector in a given situation. The learning method implemented by the at least one computing unit 310 is described in more detail with reference to FIG. 4 below.

Figure 4:
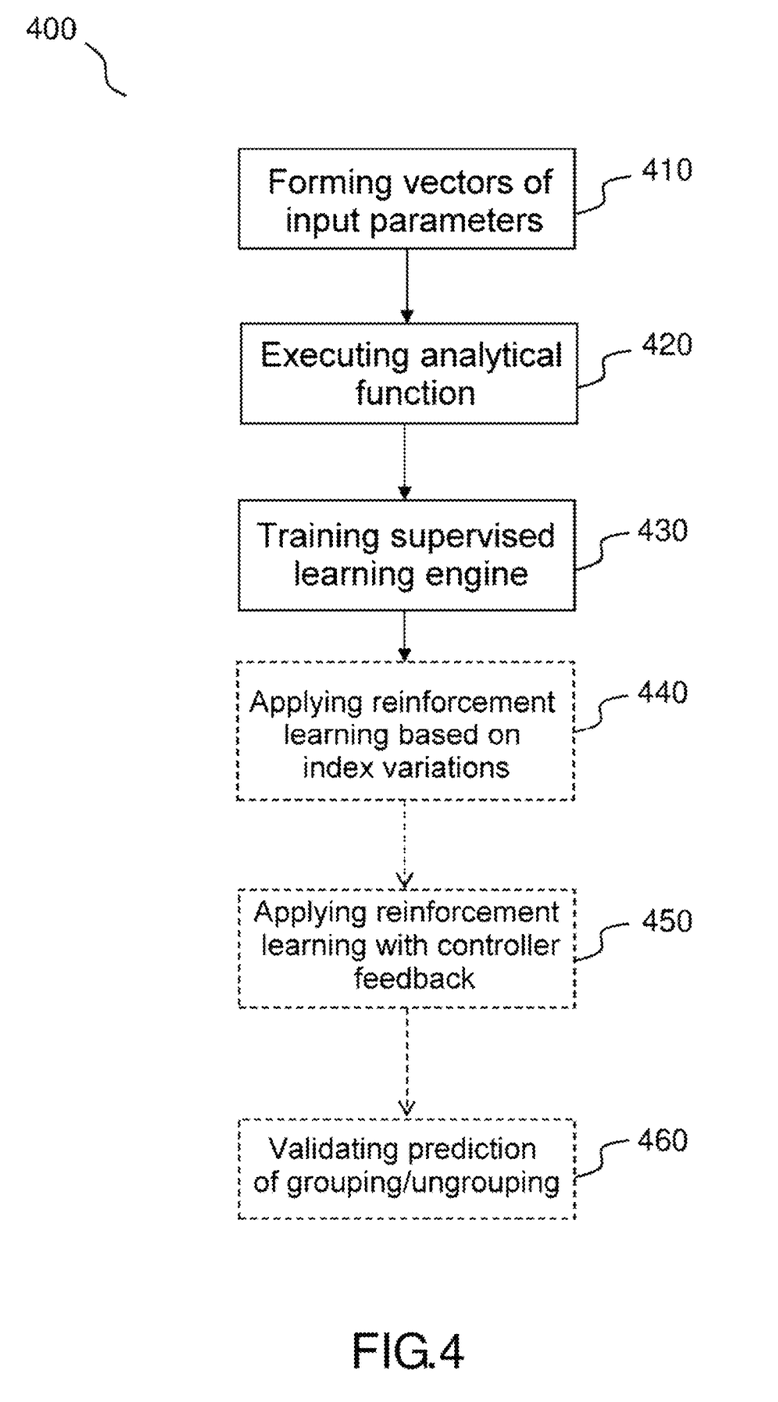
FIG. 4 shows a method for training a supervised machine-learning engine for determining the processing complexity of an ATC situation, in a set of modes of implementation of the invention.

FIG. 4 shows a method for training a supervised machine-learning engine to learn the processing complexity of an ATC situation, in a set of modes of implementation of the invention.

The method 400 has as input a set of ATC situations such as the ATC situations 340. The method 400 comprises a subset of steps intended to associate, with each situation of a set, one vector of input parameters and one ATC-complexity index. The steps of the method 400 may be executed on all or some of the ATC situations.

The method 400 comprises a step 410 of forming, on the basis of the set of parameters of an ATC situation 340, a vector of input parameters. This vector is formed from all of the parameters associated with a given ATC situation, such as the flight paths of the aircraft crossing the sector, or the weather in the sector for the duration of the situation in question. This step allows, for each ATC situation, significant input parameters to be formalized in the form of a vector usable as input of a machine-learning engine.

The method comprises a step 420 of executing an analytical function for computing an ATC-complexity index, on the basis of the input parameters.

A analytical computing function is a function that allows a complexity index of the airspace to be computed via operations and equations applied to the input parameters. Thus, such a function will be able to evaluate parameters indicative of the processing complexity of a situation, such as the density of air traffic, the number of possible conflicts between paths of nearby aircraft, etc.

Many analytical functions may be used. As indicated above, the publication "*Sector Complexity Study—SESAR 2020*", A study commissioned by the Croatia Control Ltd, Faculty of Transport and Traffic Sciences, Univ of Zagreb, July 2018 presents many analytical functions for computing ATC complexity.

The complexity index may be expressed in various ways. For example, it may be expressed in the form of a scale, for example a number between 0.1 and 0.9. In one set of embodiments of the invention, the complexity-computing function consists in carrying out a minute-by-minute sum of an indicator of the occupancy/complexity of the situation. For example, this indicator may be initialized to 0.9; increased by 0.2 if the flight tendency is unstable at a reference position, and further increased by 0.2 if the average flight speed is less than 300 knots. This thus makes it possible to increase the complexity indicator, if the aircraft are flying fast and/or if their paths change a lot. This function is given merely by way of example, and many other analytical functions, consisting in computing a complexity indicator on the basis of operations and equations applied to the input parameters may be used.

Steps 410 and 420 are repeated for each ATC situation. When a vector of input parameters, and a complexity index, have been obtained for the desired situations, the method 400 comprises a step 420 of training a supervised machine-learning engine such as the engine 320, said engine having as input the associations, for each situation respectively, between the vector of input parameters and the complexity index corresponding to each situation.

The method then comprises a step 430 of training a supervised machine-learning engine 320 that has as input associations, for each situation respectively, between its vector of input parameters and its ATC-complexity index.

Thus, for each situation, the vector of input parameters serves as feature vector, and the computed complexity index as label. The machine-learning engine 320 may thus be trained to predict the results of the analytical function, for each situation.

Once trained, the machine-learning engine 320 is capable of predicting the complexity of a situation on the basis of the parameters thereof. Such an engine has the advantage of requiring limited resources to predict the complexity of a given situation. Thus, machine-learning engines are able to predict the complexity of a situation in a limited time, whatever the parameters associated with the situation, unlike analytical functions, the computation time of which may vary substantially, and become very long for particularly complex situations. This therefore ensures that it is possible to determine the complexity of a situation practically in real time.

In a set of embodiments of the invention, the method 400 comprises, for at least one ATC situation, carrying out reinforcement learning on the basis of data representative of the workload experienced by an air-traffic controller in the situation.

This makes it possible to improve the learning acquired on the basis of the analytical functions, by carrying out a reinforcement on the basis of data representing, directly or indirectly, an interaction with an air-traffic controller in a given situation. This therefore allows the learning to be further improved, and the machine-learning engine to perform complexity computations that reflect reality better than those performed by the analytical functions. As will be explained below, these interactions with controllers may be both direct, through feedback from a controller as to the computed indices, and indirect, for example through measurements representative of the activity or workload of a controller that are recorded in real time in the ATC situation.

In one set of embodiments of the invention, the method 400 comprises, for at least one situation, a step 440 of refining the complexity indices on the basis of data 350 representative of the workload experienced by an air-traffic controller that are recorded for the sector and during the time period, and of applying reinforcement learning to the supervised machine-learning engine, on the basis of the refined index.

The refinement consists in refining the complexity indices to take account of the intensity of the interactions that occurred during the processing of the sector by the air-traffic controller during the time period and/or of the workload experienced by the controller. Specifically, as indicated above, the data 350 are representative of actual processing complexity, this possibly allowing the index computed by the analytical functions to be improved, and thus the learning of the supervised learning engine 320 to be improved.

For example, a variation in the complexity indices may be obtained on the basis of the data 350: a positive or negative variation may be applied, if the computed complexity index is inconsistent with the data 350 for the situation. For example, if a low complexity index was computed beforehand, but the data 350 indicate very many interactions between the controller and the aircraft during the corresponding period (for example, a very high number of CPDLC messages), a positive variation may be associated with the situation. Conversely, if a high complexity index was computed beforehand, but the data 350 indicate a low level of interaction between the controller and the air-traffic-control interface (low number of clicks, few mouse movements, etc.), a negative variation may be associated with the complexity index.

Once a complexity-index variation has been obtained for the various ATC situations, reinforcement learning is applied to the supervised learning engine 320, so as to iteratively re-train the supervised learning engine, with the objective of refining its learning to account for the variations for each situation.

In one set of embodiments of the invention, the method 400 also comprises, for each situation, a step 450 of applying reinforcement learning to the supervised learning engine 320 depending on feedback from at least one air-traffic controller as to the computed ATC-complexity index.

This step consists, first of all, in presenting, to an air-traffic controller, one of the training ATC situations and the index computed by the supervised learning engine 320. The ATC situation may be presented via simulation, so as to simulate the situation for the controller.

Once the situation and the ATC-complexity index have been presented to the controller, the latter may enter a perceived complexity discrepancy. This discrepancy represents the difference between the complexity perceived by the controller, and the complexity computed by the engine 320. For example, if the complexity index is expressed on a scale ranging from 1 to 100, the controller may enter a positive discrepancy if he believes that the situation was actually more complex than computed by the supervised learning engine, and vice versa, the absolute value of the entered discrepancy increasing the more the controller considers the difference between the computed complexity and the real complexity to be large.

Subsequently, this discrepancy is delivered to the supervised learning engine 320 for reinforcement learning.

This procedure may be performed for a number of situations, by a number of controllers.

Reinforcement learning has the advantage of configuring the learning very efficiently with a relatively low number of inputs. For example, the applicant has observed that applying reinforcement learning to the processing of 200 situations by 5 controllers allows learning to be achieved very efficiently, the supervised learning engine 320 then being far more efficient than the analytical functions. The number of situations to be processed is quite reasonable, and in any case lower by several orders of magnitude than the number of situations that would have been required to carry out supervised learning exclusively based on the indices determined by controllers, without carrying out steps 420 and 430 beforehand.

These aspects of the invention therefore provide a very effective method for learning the complexity of ATC situations, requiring a limited contribution from air-traffic controllers.

Once the learning engine 320 has been trained, it is capable of computing a complexity index for a given ATC situation, on the basis of a vector of data of the same type as those with which it was trained, in particular comprising meteorological information and the paths of aircraft over a sector for a given time period.

This allows a suitable number of air-traffic controllers to be assigned to a sector, but also the number and size of the ATC sectors of a space to be configured depending on the complexity of said sectors. This configuration of an airspace may in particular be done by grouping sectors, i.e. merging a plurality of sectors into one, or ungrouping them, i.e. separating one ATC sector into a plurality of sub-sectors.

The grouping and ungrouping may be done in various ways. For example, if the complexity of two contiguous sectors drops below a predefined threshold, they may be grouped into one sector. Conversely, if the complexity of an ATC sector becomes greater than a predefined threshold, it may be ungrouped into a plurality of sectors.

For example, grouping may be carried using a tree-based optimization algorithm traversed from bottom to top: each of the leaves represents the smallest possible elementary sector, contiguous sectors then being grouped iteratively in 2's or 4's up to the root, which corresponds to the largest possible sector, an entire FIR for example. Complexity is computed from bottom to top for each elementary sector, then for each possible group of sectors. Sectors may then be grouped if one or more conditions are met: if the complexity of a group is less than the sum of the complexities of the elementary sectors from which it is formed, if the complexity of a group is less than a predefined threshold, etc.

It is therefore possible, once the engine has been trained, to make, for the ATC situations 340, retroactive sector grouping and ungrouping predictions, i.e. to determine what sector grouping and ungrouping decisions would have been made, in the situations 340, on the basis of the complexity indices computed by the supervised learning engine 320 once trained.

These predictions may be compared with the decisions 360 actually made by controllers in these situations.

This may for example be used to validate the training of the supervised learning engine 320: if the decisions predicted on the basis of the complexity computations are, generally, close enough to the decisions actually made by air-traffic controllers, the training of the engine 320 may be considered to be credible, and to allow it to predict the complexity of ATC situations appropriately.

This may also allow the reinforcement learning applied to the engine 320 to be improved: reinforcement learning may be carried out with the aim of minimizing the discrepancies between the sector grouping/ungrouping predictions made on the basis of the complexity computations performed by the engine 320 and the decisions actually taken by controllers.

In FIG. 4, the steps of the method 400 have been presented in the following order: steps 410, 420, 440 and 450 then step 460. However, this order is given by way of indication, and, in certain embodiments of the invention, certain steps may not be performed, or may be performed in different orders. For example, it is possible to perform only one of the steps 440 and 450 of applying reinforcement learning, and to perform them in the opposite order to the one presented in FIG. 4 (i.e. step 450 then 440), or to execute them in parallel.

Figures 5, 6:
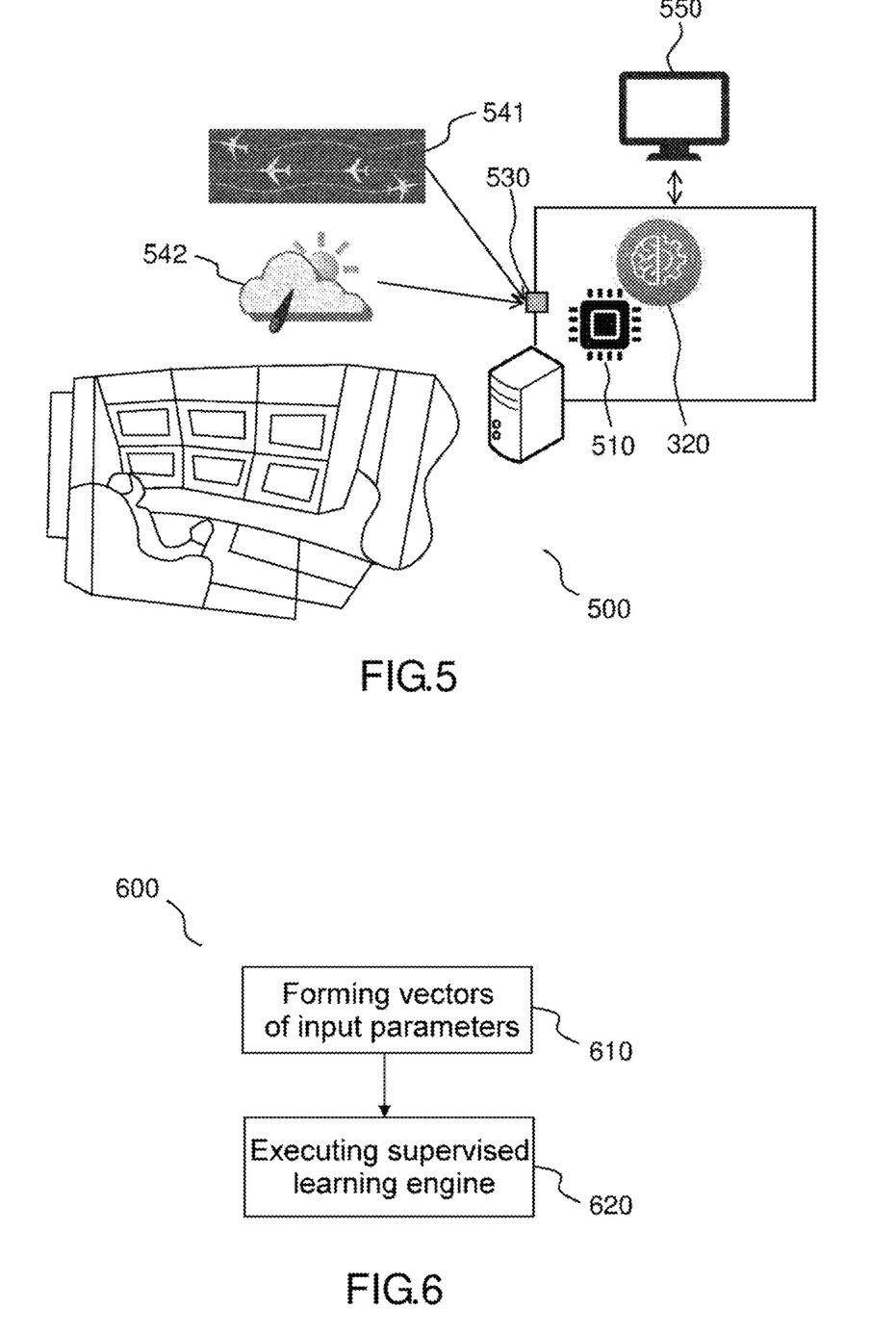
FIG. 5 shows a system for computing the processing complexity of an ATC situation using a supervised machine-learning engine, in one mode of implementation of the invention.
FIG. 6 shows a method for computing the processing complexity of an ATC situation using a supervised machine-learning engine, in one mode of implementation of the invention.

FIG. 5 shows a system for computing the processing complexity of an ATC situation using a supervised machine-learning engine, in one mode of implementation of the invention.

The system 500 may for example be an ATM, ATC or ATFM system, allowing air-traffic controllers to control the ATC situation in a given sector.

The system 500 is a computing system. According to one set of embodiments of the invention, the system 300 may be a single computing device such as a desktop computer, a server, or any other system able to perform computations. The system 500 may also comprise a plurality of computing devices. For example, the system 500 may be a server farm comprising multiple servers.

The system 500 thus comprises at least one computing unit 510 able to execute a supervised machine-learning engine 320, similar to the supervised learning engine presented with reference to FIG. 3. According to one set of embodiments of the invention, the supervised machine-learning engine 320 has been trained using a method such as the method 400, and/or a system such as the system 300.

The at least one computing unit 310 may be any type of computing unit able to perform computations. For example, the computing unit may be a processor configured with machine instructions, a microprocessor, an integrated circuit, a microcontroller, a programmable logic controller, or any other computing unit able to be programmed to perform computing operations.

The system 500 comprises at least one input port 530 able to receive a set of parameters relative to a current ATC situation in a sector. The parameters are of the same type as the input parameters 340. The system 500 may therefore receive:
the paths 541 of aircraft crossing the sector. According to various embodiments, these paths may comprise instantaneous paths and/or predicted paths;
meteorological information 542 for the sector.

According to various embodiments, other types of input parameters may be received.

The input parameters may be received in various ways. For example, the aircraft paths may be received via radio communication with the aircraft, via radar measurements, etc. The meteorological information may for example be received via measurements from a weather radar, or via subscription to a weather service.

To this end, the at least one port 530 may be of various types: internet connection, radio link, etc. The invention is not restricted to one type of input port, and a person skilled in the art will be able to configure the reception of the input parameters to the available input channels. Likewise, according to various embodiments of the invention, the various input parameters may be received on a single port, or a plurality of ports, of the same type or of different types. For example, the aircraft paths 541 may be received via a radio link, and the meteorological information 542 via an Internet connection.

The at least one computing unit 510 is configured to form, for the current ATC situation, a vector of input parameters comprising parameters of the set.

The at least one computing unit 510 is also configured to compute, on the basis of the input vector, an ATC-complexity index of the current situation.

The system 500 is thus capable of computing an ATC-complexity index of the current situation, while benefiting from the advantages of the training of the supervised learning engine.

In particular, the supervised learning engine 320 allows ATC-complexity indices to be computed with limited resource requirements, and a determinable execution time. This allows the variation in the complexity of the sectors over time to be taken into account in a reactive manner.

Once the ATC-complexity index has been computed, the system 500 may use it in various ways. For example, it may display it to at least one operator, an air-traffic controller for example, via at least one screen 550. This allows the operator to check that the number of air-traffic controllers assigned to a given situation/sector is adequate, given the complexity thereof. It may also raise an alarm, either if the ATC complexity of a situation is too high with respect to the number of controllers assigned to process it, or too low, in which case too many air-traffic controllers have been mobilized for this situation.

In one set of embodiments of the invention, the at least one computing unit 510 is configured to dynamically redefine the shape and size of the sectors, in order to form the lowest possible number of sectors, while ensuring that the ATC complexity of each sector is below a predefined threshold.

This may for example be achieved if the at least one computing unit is configured to solve a constrained optimization problem, aiming to minimize the number of sectors, with the constraint that the ATC complexity of each sector must be less than or equal to a predefined complexity threshold. This complexity threshold may for example be a threshold above which the sector becomes too complex to be processed by the air-traffic controllers.

In each optimization iteration, the ATC complexity of a situation represented by a sector and a given period may be computed by the supervised learning engine 320. Unlike analytical methods, the time taken by the supervised learning engine 320 to compute the complexity of a sector is limited and determinable. This therefore allows a constrained optimization problem to be solved, to recompute complexity in each iteration for each sector and time period. This allows ATC sectors to be allocated dynamically. For example, the sectorization of the airspace may be redefined every one hour.

This allows the number of sectors to be minimized, and thus the number of controllers required to process them to be limited, while ensuring that they can be processed correctly by the controllers. This also allows the number of controllers that will have to be assigned to an airspace for each time period to be predicted dynamically.

FIG. 6 shows a method for computing the processing complexity of an ATC situation using a supervised machine-learning engine, in one mode of implementation of the invention.

The method 600 receives as input, for a current ATC situation defined by a current sector and a time period, a set of parameters comprising, for the current sector:
the paths of aircraft 541 crossing the sector;
meteorological information 542.

The method comprises a step 610 of forming, for the current ATC situation, a vector of input parameters comprising parameters of the set.

The method then comprises a step 620 of executing a supervised learning engine 320 to compute, on the basis of the input vector, an ATC-complexity index of the current situation, said engine having been trained using the method 400.

All of the embodiments discussed with reference to FIGS. 3 to 5 are respectively applicable to the method 600.

The above examples demonstrate the ability of the invention to compute the processing complexity of an ATC situation. These examples are however given only by way of example and in no way limit the scope of the invention, which is defined in the claims below.

The invention claimed is:

1. A method for predicting a complexity index of an Air-Traffic Control situation using a supervised machine learning engine, the method being implemented in an Air-Traffic Control (ATC) system, the method comprising a training phase and an inference phase, wherein in the training phase comprises training the machine learning engine, said method comprising receiving as input a set of ATC situations from at least one data storage medium, each ATC situation being defined by a sector of an airspace and a time period, the ATC situation having occurred in said sector and in said time period, each ATC situation being associated with a set of input parameters stored in said at least one data storage medium, said set of input parameters being representative of the processing complexity of the sector corresponding to the ATC situation and comprising:
    aircraft paths corresponding to paths of aircraft having crossed the sector of the ATC situation;
    meteorological information for the sector and the time period of the ATC situation; the training phase comprising iteratively implementing the following steps, for each ATC situation:
    forming a vector of input parameters comprising parameters of the set of parameters associated with the ATC situation;
    computing an ATC-complexity index of the situation, on the basis of the input parameters, using a complexity computing function applied to said input parameters, said complexity computing function being an analytical function;
    wherein the training phase comprises learning by the supervised machine-learning engine, associations, for each ATC situation, between its vector of input parameters and its computed ATC-complexity index, said vector of input parameters serving as a feature vector and said complexity index serving as a label,
    wherein the inference phase comprises predicting the complexity index of a given ATC situation in a given sector, using the trained machine learning engine, said given ATC situation being represented by a vector of data of the same type as the vector of input parameters,
    wherein the method comprises using said predicted complexity index to dynamically redefine one or more sectors or to dynamically assign air-traffic controllers to one or more sectors, and
    wherein said training phase comprises further carrying out reinforcement learning on the basis of data representative of the workload experienced by at least one air-traffic controller in each ATC situation to refine said computed complexity index, said reinforcement learning being applied to the supervised machine-learning engine, on the basis of the refined complexity index, said data representative of the workload experienced by said at least one air-traffic controller being previously recorded for said sector and during the said time period.

2. The method as claimed in claim 1, comprising, for at least one ATC situation, a step of computing variations in the ATC-complexity index on the basis of said data representative of the workload experienced by at least one air-traffic controller, and of applying the reinforcement learning to the supervised machine-learning engine, on the basis of the variations.

3. The method as claimed in claim 1 comprising, for each ATC situation, a step of applying reinforcement learning to the supervised learning engine, this comprising:
    presenting an ATC situation, and an ATC-complexity index computed by the supervised learning engine for this situation, to at least one air-traffic controller;
    receiving a complexity-index discrepancy entered by the at least one air-traffic controller; applying a penalty to the learning depending on this discrepancy.

4. The method as claimed in claim 1, comprising a step of comparing sector grouping and ungrouping predictions made on the basis of ATC-complexity indices computed by the machine-learning engine and sector grouping and ungrouping, in said set of ATC situations, by controllers.

5. The method as claimed in claim 4, comprising validating the training of the supervised learning engine on the basis of said comparisons.

6. The method as claimed in claim 4, comprising applying reinforcement learning to the supervised learning engine on the basis of said comparisons.

7. An Air-Traffic Control (ATC) system, said system being a computing system and comprising:
    a processor able to train a supervised machine-learning engine, in a training phase, and to predict a complexity index of an Air-Traffic Control situation using the trained supervised machine learning engine, in an inference phase; wherein the system comprises:
    an access to at least one data storage medium storing, for a set of ATC situations, each ATC situation being defined by a sector of an airspace and a time period, the ATC situation having occurred in said sector and in said time period, each ATC situation being associated with a set of parameters stored in said at least one data storage medium, said set of parameters being representative of the processing complexity of the sector corresponding to the ATC situation and comprising:
    aircraft paths corresponding to paths of aircrafts having crossed the sector of the ATC situation;
    meteorological information for the sector and the time period of the ATC situation;
    the processor being able, for each ATC situation, to iteratively implementing the following steps:
    form a vector of input parameters comprising parameters of the set of parameters associated with the ATC situation;
    compute an ATC-complexity index of the situation, on the basis of the input parameters, using a complexity computing function applied to said input parameters, said complexity computing function being an analytical function;
    the processor being able to train the supervised machine-learning engine, in the training phase, to learn associations, for each ATC situation, between its vector of input parameters and its computed ATC-complexity index, said vector of input parameters serving as a feature vector and said complexity index serving as a label,
    the processor being able to predict the complexity index of a given ATC situation in a given sector, in the inference phase, using the trained machine learning engine, said given ATC situation being represented by a vector of data of the same type as the vector of input parameters, wherein the processor is able to use said predicted complexity index to dynamically redefine one or more sectors or to dynamically assign air-traffic controllers to one or more sectors, and wherein the supervised machine learning-engine further carries out reinforcement learning on the basis of data representative of the workload experienced by at least one air-traffic controller in each ATC situation to refine said computed complexity index, said reinforcement learning being applied to the supervised machine-learning engine, on the basis of the refined complexity index, said data representative of the workload experienced by said at least one air-traffic controller being previously recorded for said sector and during the said time period.

8. A computer program product comprising program code instructions for executing the steps of the method as claimed in claim 1 when said program is executed on a computer.

9. The method of claim 1, wherein the method comprises solving a constrained optimization problem, aiming to minimize the total number of sectors in an airspace, while ensuring that the ATC complexity computed by the supervised learning engine for each sector and time period is less than a predefined complexity.

10. The method of claim 2, wherein if the computed complexity index is inconsistent with the data representative of the workload of at least one controller, said computed variations comprise a positive variation or a negative variation.

11. The method of claim 2, wherein in response to the computation of said variations, the reinforcement learning is applied to the supervised learning engine so as to iteratively re-train the supervised learning engine and refine its learning to account said computed variations.

12. The method of claim 1, wherein said data representative of the workload experienced by said at least one air-traffic controllers comprise data of one or more types chosen from:
- interactions between controllers and an air-traffic-control interface;
- biometric data indicative of the workload experienced by an air-traffic controller; and/or
- data relating to the interaction between the ATC system and other systems.

* * * * *